Patented May 27, 1930

1,760,044

UNITED STATES PATENT OFFICE

LUIS DE AYESTARAN, OF ZARAUZ, SPAIN

INSULATING COMPOSITION

No Drawing.   Application filed November 9, 1928.   Serial No. 318,311.

My invention relates to improvements in compositions of matter and more particularly to improvements in compositions of matter used fully for electrical insulating purposes, for structural purposes and for molding manufactured articles therefrom. A further object of my invention is the provision of a material of a synthetic nature which can readily be molded into various forms and which will withstand a moderate degree of heat without liquefaction.

My improved composition of matter is produced in the following manner.

I take 600 grams of finely powdered wood charcoal. The charcoal should be sufficiently fine as to pass through a sieve having 200 holes to the square inch and I prefer to use for this purpose a wood charcoal made from a heavy wood such as oak, though I do not confine myself to the use of this particular variety.

I then prepare a mixture of rosin or colophony obtained as an exudation from the pine tree and from which the turpentine has been distilled, ordinary beeswax and asphalt obtained from natural asphalt and having a melting point of about 60 degrees, the rosin, the bees-wax and the tar being added together in the following proportions:

300 parts of rosin, 30 parts of bees-wax and 70 parts of tar and these three ingredients are melted together and then the 600 parts of powdered charcoal is added.

The charcoal is added very gradually to the melted rosin, bees-wax and tar, so as to avoid the formation of lumps and so as to procure an absolutely uniform product. After the charcoal has been added and the mass is in a liquid condition it is gradually allowed to cool and may be cast into any appropriate form and formed into plates, rods, sheets or cast into molds depending upon the purpose for which the composition is used.

It should be further noted that it is preferable to take powdered charcoal having approximately the same specific gravity as the mixture of ingredients to which it is added, so that there will be no tendency for the charcoal to settle in the mass, it being preferable that the charcoal is evenly distributed throughout same. It should also be noted that the charcoal must be carefully dried before being added to the liquid mixture as a better product is produced with the charcoal from which all possible traces of moisture have been removed.

An insulating compound prepared according to the foregoing process is black in color, has no distinct cleavage, has a specific gravity of about 1.12 and can be readily sawn, molded or cast into any convenient shape.

Having fully described my invention what I claim is:

1. An improved composition of matter consisting of finely divided wood charcoal, rosin, bees-wax and tar, the resultant composition being a non-conductor of heat and electricity and having a specific gravity of approximately 1.12.

2. An improved composition of matter comprising 600 parts of finely divided wood charcoal, rosin 300 parts, bees-wax 30 parts and asphalt tar 70 parts, the resultant mass when cooled having a specific gravity of approximately 1.12.

3. An improved composition of matter consisting of 3 parts of finely powdered wood charcoal and two parts of a fusible mixture of rosin, bees-wax and tar, the resultant mass having high electrical resistance and a specific gravity of about 1.12.

In testimony whereof I affix my signature.

LUIS DE AYESTARAN.